US008605966B2

(12) United States Patent
Eriksson Järliden

(10) Patent No.: US 8,605,966 B2
(45) Date of Patent: Dec. 10, 2013

(54) RADIOTHERAPEUTIC TREATMENT PLANNING APPARATUS AND METHODS

(75) Inventor: Andréas Lars Gunnar Eriksson Järliden, Stockholm (SE)

(73) Assignee: Elekta AB (publ), Stockholm (SE)

( * ) Notice: Subject to any disclaimer, the term of this patent is extended or adjusted under 35 U.S.C. 154(b) by 588 days.

(21) Appl. No.: 12/934,370

(22) PCT Filed: Mar. 25, 2008

(86) PCT No.: PCT/EP2008/002340
§ 371 (c)(1),
(2), (4) Date: Sep. 24, 2010

(87) PCT Pub. No.: WO2009/118021
PCT Pub. Date: Oct. 1, 2009

(65) Prior Publication Data
US 2011/0206252 A1    Aug. 25, 2011

(51) Int. Cl.
*G06K 9/00*    (2006.01)
(52) U.S. Cl.
USPC .......................................... 382/128; 382/173
(58) Field of Classification Search
USPC .................. 382/128, 131, 154, 173, 180, 311
See application file for complete search history.

(56) References Cited

U.S. PATENT DOCUMENTS

| 2005/0163358 A1 | 7/2005 | Moeller | 382/128 |
| 2005/0163375 A1 | 7/2005 | Grady | 382/180 |

FOREIGN PATENT DOCUMENTS

| CN | 101082983 A | 12/2007 | G06T 3/40 |
| CN | 101082985 A | 12/2007 | G06T 15/00 |

OTHER PUBLICATIONS

Chuang, et al, "A Bayesian Approach to Digital Matting", *Proceedings 2001 IEEE Conference on Computer Vision and Pattern Recognition*, CVPR 2001; Los Alamitos, CA, IEEEComp. Soc US, vol. 2, Dec. 8, 2001, pp. 264-271, XP0105084131.
Levin, et al, "A Closed-Form Solution to Natural Image Matting", *IEE Transactions on PatternAnalysis and Machine Intelligence*, vol. 30, No. 2, Feb. 2008, pp. 1-15.
Li, et al, "Lazy Snapping", *ACM TOG, ACM US*, vol. 23, No. 3, Jan. 1, 2004 (Apr. 4, 2004), pp. 303-308, XP009099127.

(Continued)

*Primary Examiner* — Andrew W Johns
(74) *Attorney, Agent, or Firm* — Sunstein Kann Murphy & Timbers LLP

(57) ABSTRACT

A treatment planning apparatus comprises a means for receiving a three dimensional representation of a patient, a means for displaying at least a part of the representation, a means for user-designation of sub-regions of the representation, and a computing means adapted to segment the representation into a region within an anatomical structure and a region outside the anatomical structure on the basis of the locations of the sub-regions and the degree of similarity of voxels to neighboring voxels in the representation. The treatment planning apparatus preferably further comprises means for designating sub-regions as being inside the structure, means for designating sub-regions as being outside the structure, and/or means for designating sub-regions as being at a border of the structure. In the latter case, we prefer that the size of border sub-regions is adjustable. The computing means can segment the representation by minimizing a cost function. We also prefer that the initial values of the function in sub-regions designated as being in a border region are constrained to a different preset value. In an particularly useful aspect of this invention, after minimization of the function the values in sub-regions designated as being in a border region are then un-constrained, the remaining values are constrained, and the function is then minimized a second time.

23 Claims, 2 Drawing Sheets

(56) References Cited

OTHER PUBLICATIONS

Ronfard, Region-Based Strategies for Active Contour Models, *International Journal of Computer Vision*, 13:2, pp. 229-251 (1994).

Rother, et al, "Grab Cut—Interactive Foreground Extraction using Integrated Graph Cuts", ACM, TOG, ACM, US, vol. 23, No. 3, Aug. 1, 2004, pp. 309-314, XP002340109.

European Patent Office, EPO Search Report, Application No. 08716684.9-2218, dated Feb. 8, 2012, 5 pages.

European Patent Office, EPO Search Report, Application No. 08716684.9-2218, dated Sep. 18, 2012, 9 pages.

Grady, "Random Walks for Image Segmentation" IEEE Transactions on Pattern Analysis and Machine Intelligence, IEEE Service Center, Los Alamitos, CA, US, vol. 27, No. 11, Nov. 1, 2006, pp. 1768-1783, XP011149294 ISSN: 0162-8828.

Xue Bai., et al, "Distancecut: Interactive Segmentation and Matting of Images and Videos" Image Processing, 2007. ICIP 2007. IEEE International Conference on, IEEE, P1, Sep. 1, 2007, pp. 11-249, XP031157908.

Jianbo Shi., et al, "Normalized cuts and image segmentation" Computer Vision and Pattern Recognition, 1997. Proceedings., 1997 IEEE Computer Society Conference on San Juan, Puerto Rico Jun. 17-19, 1997, Los Alamitos, CA, USA,Ieee Comput. Soc, US, Jun. 17, 1997, pp. 731-737, XP010237433 ISBN: 978-0-8186-7822-6.

Jue Wang, et al, "An Iterative Optimization Approach for Unified Image Segmentation and Matting," Computer Vision, 2005. ICCV 2005, Tenth IEEE International Conference on Beijing, China, Oct. 17-20, 2005, Piscataway, NJ, USA, IEEE, vol. 2, Oct. 17, 2005, pp. 936-943, XP010856918, ISBN:978-0-7695-2334-7.

Levin, et al, "Colorization using optimization," In ACM SIGGRAPH 2004 Papers (Los Angeles, California, Aug. 8-12, 2004). J. Marks, Ed. SIGGRAPH '04. ACM Press, New York, NY, 689-694.

European Patent Office, International Search Report dated Feb. 20, 2009, PCT/EP2008/002340.

State Intellectual Property Office, P. R. China, Second Office Action, Chinese Patent Application No. 200880129531.3, dated Mar. 26, 2013, 25 pages.

RADIOTHERAPEUTIC TREATMENT PLANNING APPARATUS AND METHODS

FIELD OF THE INVENTION

The present invention relates to a radiotherapeutic treatment planning apparatus, and to associated methods.

BACKGROUND ART

Radiotherapy operates by directing a beam of harmful radiation towards a tumour. To avoid causing unnecessary harm to the healthy tissue surrounding the tumour, the beam is collimated to a suitable cross-sectional shape and is directed towards the tumour from a variety of directions.

The apparatus for producing and controlling this beam has become steadily more complex and capable over time. Current external beam radiotherapy can now direct the beam towards the patient from a steadily rotating gantry while collimating the beam to a complex and varying cross-sectional shape that is tailored to deliver a varying dose rate to the patient to create a three-dimensional dose distribution that is maximised in the tumour, minimised in any nearby sensitive structures, and optimised in other tissue. Multiple-source radiotherapy apparatus is able to deliver precise doses to specific small volumes in the head and neck and upper shoulder areas of the patient and build these up to form similarly complex dose distributions by accurate indexing of the patient position.

To control these types of apparatus, treatment planning computers employ complex software to convert a desired dose distribution or a set of treatment constraints into a series of instructions for the physical movement and operation of the apparatus. These computers obviously need to know where the tumour is located; this information is obtained from internal scans of the patient, such as CT scans or the like.

This requires that a physician "segment" the scan, i.e. outlines the volume containing the tumour and volumes containing any sensitive structures such as the optic nerve, the digestive system, etc. Segmenting structures is therefore an important task in treatment planning applications, since the treatment planning process depends (inter alia) on the accuracy of segmentation for the quality of its results. There are many segmentation tools, spanning from completely manual ones to fully automatic ones.

The advantage of manual methods however is that they provide full (or at least much more) control over the result. The drawback is that it is very time consuming, difficult, and tedious to segment large 3D structures manually.

One drawback of many automatic methods—especially advanced ones—is the lack of control of the result. No method can be expected to be fully accurate in all cases, and when the result is not acceptable, there is often no way to correct it, or it must be corrected with purely manual tools—thereby cancelling some of the benefits of automatic methods.

Our GammaPlan™ and SurgiPlan™ tools currently provide manual outlining and a simple semi-automatic tool that works for certain images with good contrast, between target and background. These tools are useful, but could benefit from being more powerful.

SUMMARY OF THE INVENTION

The present invention therefore provides a treatment planning apparatus comprising a means for receiving a three dimensional representation of a patient, a means for displaying at least a part of the representation, a means for user-designation of sub-regions of the representation, and a computing means adapted to segment the representation into a region within an anatomical structure and a region outside the anatomical structure on the basis of the locations of the sub-regions and the degree of similarity of voxels to neighbouring voxels in the representation.

The at least part of representation can comprise one or more planar sections through the representation, such as axial, sagittal and/or coronal views of the patient.

The treatment planning apparatus preferably further comprises means for designating sub-regions as being inside the structure, means for designating sub-regions as being outside the structure, and/or means for designating sub-regions as being at a border of the structure. In the latter case, the size of border sub-regions can be made adjustable.

The treatment planning apparatus may be a standalone system, or it may include within its ambit part or all of a diagnostic imaging systems. Often, a radiologist will segment a tumour or other structure on a suitable workstation (such as a PACS™ workstation) and store the result for further processing within the treatment planning system. That further processing may take place on the same workstation or on another workstation, server or other processing means that has access to the stored segmentation result, for example by way of a networking arrangement.

The computing means can segment the representation by minimising a function of the type described herein, which begins with an array of values $I(x)$ where x is a specific pixel or voxel in which some values are unknown and some are constrained to specific values, and produces an output array $I(x)$ in which the previously unknown values are calculated and the previously constrained values are unchanged. Suitably, $I(x)$ is 0 for voxels outside the segmented volume and 1 for voxels within the segmented volume. Ideally, the values of $I(x)$ are constrained in the sub-regions.

Preferably, the function is a cost function that is minimised by the computing means through variation of the values of $I(x)$.

We also prefer that the initial values of $I(x)$ in sub-regions designated as being in a border region are constrained to a different preset value. In an particularly useful aspect of this invention, after minimisation of the function the values of $I(x)$ in sub-regions designated as being in a border region are then made un-constrained, the remaining values of $I(x)$ are constrained, and the function is then minimised a second time.

In this aspect, the remaining values of $I(x)$ can be constrained to their values after the first minimisation, or to a preset value based on their value after the first minimisation, such as that of an inside voxel or an outside voxel. For example, the remaining values of $I(x)$ having a value after the first minimisation above a preset threshold can be constrained to a preset value corresponding to that of an inside voxel, and the remaining values of $I(x)$ having a value after the first minimisation below a preset threshold constrained to a preset value corresponding to that of an outside voxel.

The technique can be extended from the segmentation of 3D (or 2D) scans to four-dimensional scans, i.e. time series 3D images. Such scans may be relevant in a range of areas, such as treatment planning in respect of cyclically moving tumours such as lung or mammary tumours.

BRIEF DESCRIPTION OF THE DRAWINGS

An embodiment of the present invention will now be described by way of example, with reference to the accompanying figures in which.

DETAILED DESCRIPTION OF THE EMBODIMENTS

We describe a new segmentation technique adapted from a method for image matting (see reference 1) and colourisation of images (see reference 2), that combines the best properties of manual and automatic methods. The method gives the user complete control of the result and yet automates much of the work so that only a minimum of user interaction is needed.

Figure 1:
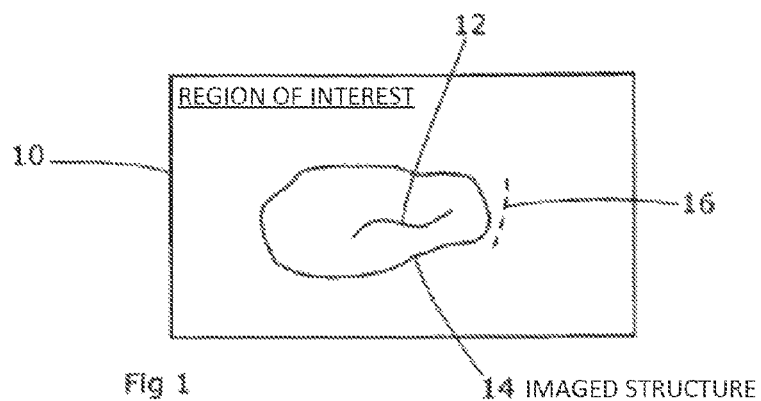
FIG. 1 illustrates a scribble-based segementation process.

With this technique, the user annotates the image or region of interest 10 with two types of scribbles as shown in FIG. 1, that mark the scribbled pixels as either inside or outside. Thus, a first type of scribble 12 is applied by an operator to denote a region of the image 10 that is within an imaged structure 14, and a second type of scribble 16 denotes a region of the image 10 that is outside an imaged structure 14. Any number of scribbles of either type can be added, if the operator feels it necessary to further constrain the result.

FIG. 1 is of course two-dimensional whereas the scans that will be used by physicians will generally be three dimensional. In practice, a physician will work on a two dimensional projection or a planar section from the three dimensional image and the system will then process the three-dimensional image on the basis of the physician's inputs. Accordingly, in this description the terms "pixel" and "voxel" will be used interchangeably.

Scribbles can be added by brush strokes applied via a human interface device (HID) such as a mouse or a stylus of a graphics tablet. Different types of scribble can be denoted by selecting a new mode (via a graphical user interface or otherwise), or by using different controls on the or another HID, such as the left & right mouse buttons, or a SHIFT key on a keyboard in combination with a mouse or stylus movement etc. Scribbles may be of any suitable shape chosen by the operator, or may be simple point selections via single mouse clicks, for example.

Each pixel in the region of interest is then allocated an inside or outside value by the system. These values are initially unknown for all unannotated pixels, and constrained to (for example) 0 for outside scribbles and 1 for inside scribbles. If preferred, all pixels at the edge of the region of interest 10 can be automatically annotated as "outside". To compute the unknown values, a further constraint is added that the value of each pixel should be similar to the values of its neighbouring pixels; the more similar (in intensity, typically) a pixel is to one of its neighbours, the more similar their inside/outside values should be. This problem is formulated as a cost function;

$$C(I) = \sum_x \left( I(x) - \sum_{y \in N(x)} \omega_{xy} I(y) \right)^2 \quad (1)$$

where $I(x)$ is the inside/outside value of pixel x, $N(x)$ is a neighbourhood of pixels around x, and $\omega_{xy}$ is a measure of how similar pixels x and y are that sums to one for a given x.

The squaring of the sum acts to ensure that all values are positive. Other functions could achieve this, such as a different (even) power or an abs(n) function.

For the $\omega_{xy}$ function, we use $$\omega_{xy} = e^{-\frac{(J(x)-J(y))^2}{2\sigma_x^2}} \quad (2)$$

where $J(x)$ is the intensity (typically) of pixel x, and $\sigma_x^2$ is the variance of the intensity (typically) in a neighbourhood around pixel x.

We then normalize these values so that they sum to one for a given x using $$\omega_{xy} \leftarrow \frac{\omega_{xy}}{\sum_y \omega_{xy}} \quad (3)$$

The system is solved for the set of inside/outside values $I_{min}$ that minimises $C(I)$. The subset of pixels x for which $I_{min}(x)$ is greater than a preset value (for example 0.5) constitutes the segmentation result.

This technique has several advantages:

Very few annotations are needed; with good images, it is often enough to draw a single, quick inside scribble.

The user interface is just like paintbrushing in any drawing application and should be very familiar to users. As soon as the user stops drawing a stroke, the system computes all the unannotated pixels.

There is no need for accurate annotations: compared to outlining the border of a structure, drawing inside or outside scribbles can be done quickly and roughly.

The user can draw in any combination of views—e.g. axial, sagittal and coronal views—and thus use the best view for each part of the structure. Many other methods require all annotations to be in one view only, such as the axial view.

It works for difficult images. Many techniques are simply unusable for difficult images. With this technique, the user simply has to draw more annotations if the images are of poor quality.

Figure 2:
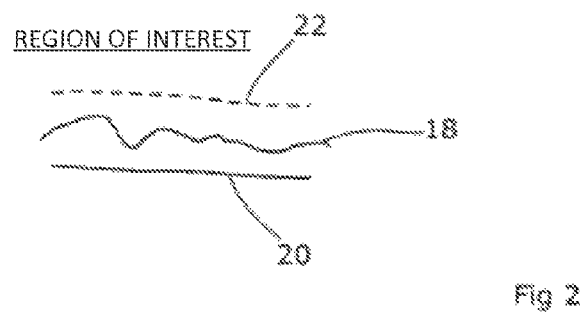
FIG. 2 shows the use of inside and outside scribbles to constrain the border to a region.

The above scribble-based technique has many advantages, as set out. However, the lack of a border scribble can sometimes be a limitation. For one thing, users might be very accustomed to outlining. There are also some cases where a pure "inside/outside" system might require close and parallel inside and outside strokes to constrain the border of a structure to a certain area, such as is illustrated in FIG. 2; here, a border 18 is irregular and perhaps somewhat vague and therefore in order to obtain a good segmentation a closely nearby inside scribble 20 may be needed in combination with a similar outside scribble 22. If a border stroke type is permitted in addition, then only half the number of scribbles would be needed.

Also, when the image provides little guidance to the automatic properties of the algorithm, border scribbles would allow the segmented structure to be modelled in a way similar to a radial basis function method, by specifying where the border is at a few places.

The simplest way to implement border scribbles is to simply constrain those pixels to 0.5. This is not a perfect solution, however, since it requires the user to accurately draw the border strokes, the exact problem encountered in known systems. Although it is easy to accurately place a single point, a border stroke has to be at least of some length to be effective since border point constraints tend to only affect the cost function very locally. Instead, what is needed is some way for the user to say that "the edge is roughly along this stroke", which is precisely what a second embodiment of this invention provides.

In this second embodiment, the user interface is extended by the provion of a type of fuzzy border scribble. The width of the border strokes can be adjusted by (for example) the mouse wheel or by the stylus pressure if a tablet is used. The width of the scribble is interpreted by the system as indicating the uncertainty of the stroke—so the resulting border should be somewhere within the border stroke, but it is up to the system to automatically determine the best position. This allows the user to quickly suggest to the system approximately where the border is. Still, if desired, the border can be constrained fully by using a minimal stroke width of (say) a single pixel, or otherwise.

Figure 3:
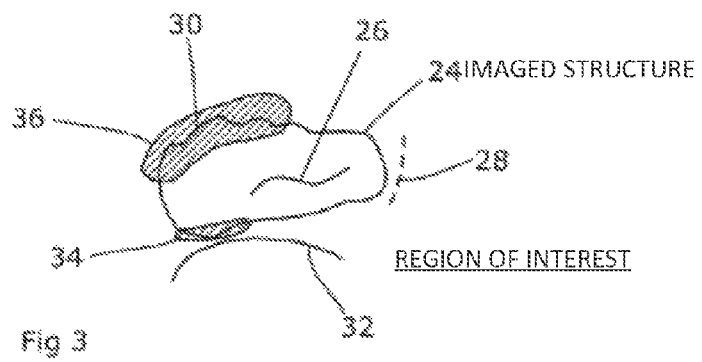
FIG. 3 shows an example of usage of fuzzy border scribbles with variable width.

This is illustrated in FIG. 3. An imaged structure 24 has been generally indicated by an inside scribble 26 and an outside scribble 28. However, the system needs some further assistance in this case in two areas, one in the vicinity of a weak edge 30 to the structure 24, and the other near to a closely located different structure 32. Therefore, a relatively narrow fuzzy border scribble 34 has been added by the user to indicate the location of the border in the vicinity of the different structure 32, and a wide fuzzy border scribble 36 has been added around the weak edge 30.

Support for fuzzy border scribbles is implemented by performing the minimisation of C(I) twice in different ways. The first time, the inside/outside values of annotated border pixels are all constrained to an intermediate value such as 0.5, the value of inside or outside pixels are constrained to 1 and 0 respectively (as before), and the inside/outside values of all unannotated pixels are then computed. This produces a segmentation result in which values are added to all pixels except for those within the fuzzy border scribbles.

Figure 4:
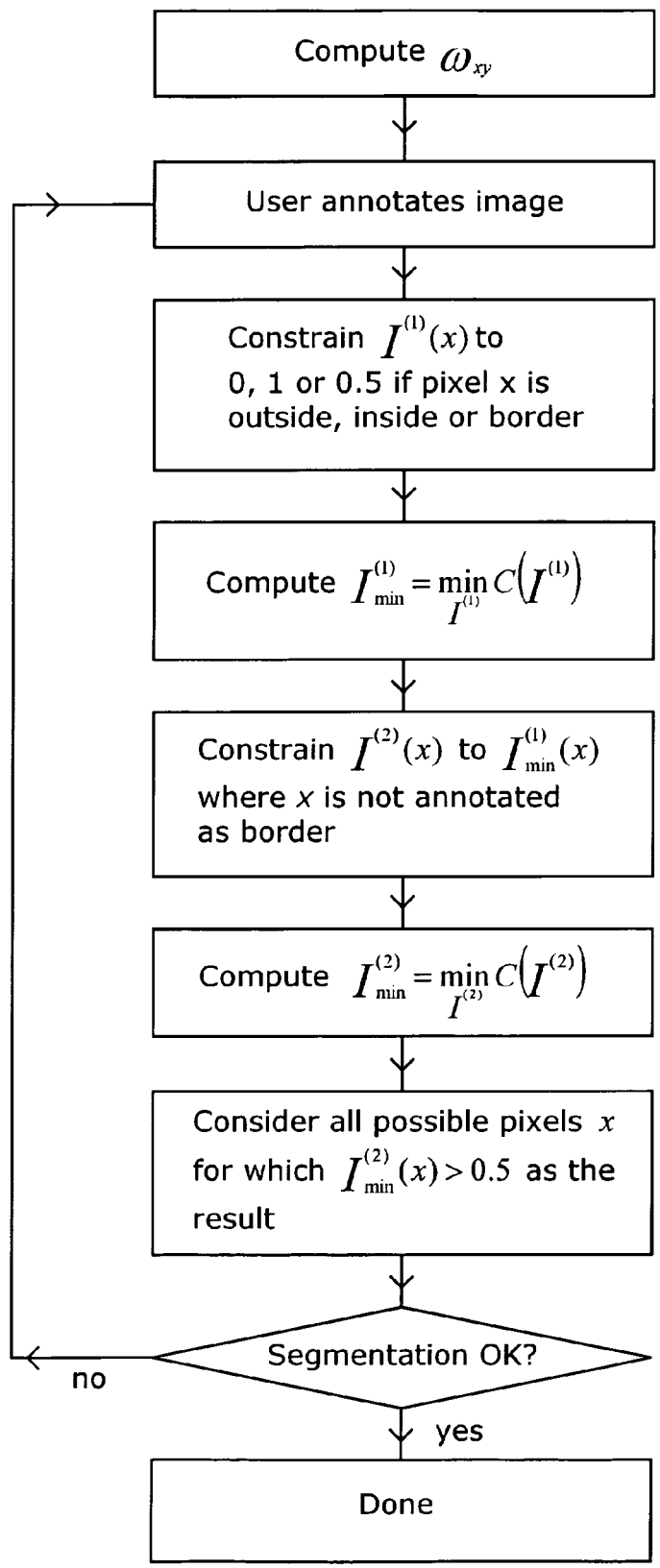
FIG. 4 shows a flowchart of a process according to the present invention.

In the second step, all values except for those pixels annotated as border pixels are constrained to the values that resulted from the first step. Alternatively, each of these pixels can be constrained to 0 or 1, depending on if it is below or above a present threshold such as 0.5. Then the inside/outside value of the border pixels are computed. Again, the set of pixels with a value above a preset threshold (such as larger than 0.5) constitute the result. If the user is not satisfied with the result, more scribbles are added and the double minimisation is repeated. This process is illustrated in the flowchart in FIG. 4.

Although this process requires two minimisations, the second minimisation has much fewer unknowns. Therefore, this causes only a slight additional overhead compared to the original method of only inside and outside scribbles.

In a further variation of the invention, the border strokes can have a constant width of (for example) a single pixel, and, in the second minimization, instead of constraining the inside/outside values of all pixels not previously annotated as border pixels, all pixels that are deemed "uncertain" are constrained. The "uncertain" pixels are those that have an inside/outside value (after the first minimisation) that is close to the value of a border pixel, say 0.5. For example, all pixels within certain preset limits of a border value might be selected. The advantage of this approach is that the system automatically determines the uncertainty in the stroke; the drawback is of course that the system can be wrong and this gives the user less control.

Figure 5:
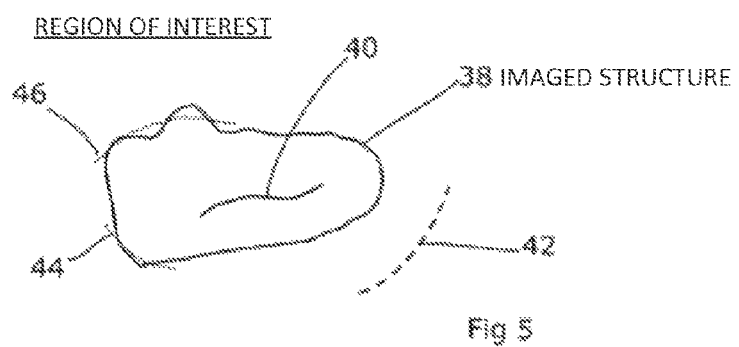
FIG. 5 shows an alternative outlining method according to the present invention.

The use of this approach is illustrated in FIG. 5. An imaged structure 38 is marked up by an operator using four scribbles of three different types. An inside scribble 40 denotes the interior of the structure 38. An outside scribble 42 indicates an area outside the structure 38. An edge near an adjacent structure is indicated via a border scribble 44, and a weak edge is indicated by a further border scribble 46.

The system will of course place the scribbles on the relevant two-dimensional plane in the three-dimensional dataset, and extend the minimisation into the three-dimensional dataset to produce a 3D segmentation. In the same way, the minimisation can be extended into a 4D dataset such as a time series of a 3D image.

REFERENCES

1. Levin, A., Lischinski, D., and Weiss, Y. 2006. A Closed Form Solution to Natural Image Matting. In *Proceedings of the* 2006 *IEEE Computer Society Conference on Computer Vision and Pattern Recognition—Volume* 1 (Jun. 17-22, 2006). CVPR. IEEE Computer Society, Washington, D.C., 61-68.
2. Levin, A., Lischinski, D., and Weiss, Y. 2004. Colorization using optimization. In *ACM SIGGRAPH* 2004 *Papers* (Los Angeles, Calif., Aug. 8-12, 2004). J. Marks, Ed. SIGGRAPH '04. ACM Press, New York, N.Y., 689-694.

It will of course be understood that many variations may be made to the above-described embodiment without departing from the scope of the present invention.

The invention claimed is:

1. A treatment planning apparatus comprising:
   a means for receiving a three dimensional representation of a patient,
   a means for displaying at least a part of the representation,
   a means for user-designation of sub-regions of the representation, and
   a computing means adapted to segment the representation into a region within an anatomical structure and a region outside the anatomical structure on the basis of the locations of the sub-regions and the degree of similarity of voxels to neighbouring voxels in the representation;
   wherein the means for user-designation of sub-regions of the representation includes means for user-designation of sub-regions by means of a border stroke specifying the position of an edge of the anatomical structure at a few places, the computing means interpreting the border stroke and determining the edge position.

2. A treatment planning apparatus according to claim 1 in which the at least part of the representation comprises one or more sections through the representation.

3. A treatment planning apparatus according to claim 2 in which the sections are selected from the group consisting of axial, sagittal and coronal views of the patient.

4. A treatment planning apparatus according to claim 1 further comprising means for designating sub-regions as being inside the structure.

5. A treatment planning apparatus according to claim 1 further comprising means for designating sub-regions as being outside the structure.

6. A treatment planning apparatus according to claim 1 further comprising a means for adjusting the size of a border sub-region.

7. A treatment planning apparatus according to claim 1 in which the computing means segments the representation by minimising a function having the form $$C(I) = \sum_{x} f\left(I(x) - \sum_{y \in N(x)} \omega_{xy} I(y)\right)$$

where $f$ is a function, $I(x)$ is an inside/outside value of voxel x, $N(x)$ is a neighbourhood of voxels around x, and $\omega_{xy}$ is a measure of the similarity of voxels x and y.

8. A treatment planning apparatus according to claim 7 in which $\omega_{xy}$ sums to one for a given x.

9. A treatment planning apparatus according to claim 7 in which the function $f(z)$ is of the form $f(z)=z^n$.

10. A treatment planning apparatus according to claim 9 in which n is 2.

11. A treatment planning apparatus according to claim 7 in which $I(x)$ is 0 for voxels outside the segmented volume.

12. A treatment planning apparatus according to claim 7 in which $I(x)$ is 1 for voxels within the segmented volume.

13. A treatment planning apparatus according to claim 7 in which the initial values of $I(x)$ in the sub-regions prior to minimisation of the function is constrained to a preset value.

14. A treatment planning apparatus according to claim 13 in which the preset value is different for sub-regions inside the structure and sub-regions outside the structure.

15. A treatment planning apparatus according to claim 13 in which the initial values of $I(x)$ in sub-regions designated as being in a border region are constrained to a preset value prior to minimisation of the function.

16. A treatment planning apparatus according to claim 15 in which after minimisation of the function, the values of $I(x)$ in sub-regions designated as being in a border region are un-constrained, the remaining values of $I(x)$ are constrained, and the function is minimised a second time.

17. A treatment planning apparatus according to claim 16 in which the remaining values of $I(x)$ are constrained to their values after the first minimisation.

18. A treatment planning apparatus according to claim 16 in which the remaining values of $I(x)$ are constrained to a preset value based on their value after the first minimisation.

19. A treatment planning apparatus according to claim 18 in which the remaining values of $I(x)$ are constrained to a preset value corresponding to that of an inside voxel or an outside voxel.

20. A treatment planning apparatus according to claim 19 in which the remaining values of $I(x)$ having a value after the first minimisation above a preset threshold are constrained to a preset value corresponding to that of an inside voxel, and the remaining values of $I(x)$ having a value after the first minimisation below a preset threshold are constrained to a preset value corresponding to that of an outside voxel.

21. A method of processing a three dimensional representation of a patient, comprising the steps of:
    displaying at least a part of the representation,
    designating sub-regions of the representation in which the sub-regions are designated as being one of inside the structure, outside the structure, and containing an edge of the structure, and
    segmenting the representation into a region within an anatomical structure and a region outside the anatomical structure,
    wherein the segmentation is performed on the basis of the locations of the sub-regions and the degree of similarity of voxels to neighbouring voxels in the representation, and
    wherein the designation of sub-regions containing an edge comprises drawing a border stroke specifying the edge of the anatomical structure at a few places, and the segmentation comprises interpreting the border stroke to determine the edge position.

22. A method according to claim 21 in which the segmentation is performed by minimising a function having the form $$C(I) = \sum_{x} f\left(I(x) - \sum_{y \in N(x)} \omega_{xy} I(y)\right)$$

where $I(x)$ is an inside/outside value of voxel x, $N(x)$ is a neighbourhood of voxels around x, and $\omega_{xy}$ is a measure of the similarity of voxels x and y.

23. A treatment planning apparatus according to claim 22 in which after minimisation of the function, the values of $I(x)$ in any sub-regions designated as being in a border region are un-constrained, the remaining values of $I(x)$ are constrained, and the function is minimised a second time.

* * * * *